UNITED STATES PATENT OFFICE.

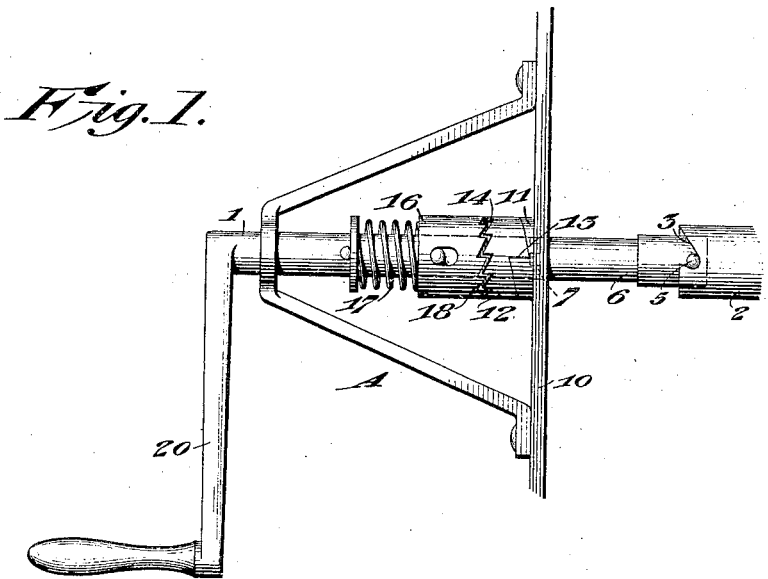

JAMES O. ROBERTS AND JOHN W. NUNN, OF GRANGER, TEXAS.

STARTING DEVICE FOR ENGINES.

1,037,663.  Specification of Letters Patent.  Patented Sept. 3, 1912.

Application filed August 21, 1911. Serial No. 645,140.

*To all whom it may concern:*

Be it known that we, JAMES O. ROBERTS and JOHN W. NUNN, citizens of the United States, residing at Granger, in the county of Williamson and State of Texas, have invented certain new and useful Improvements in Starting Devices for Engines, of which the following is a specification.

Our invention relates to an improvement in starting devices for automobiles, which is preferably permanently attached to the car and is provided with a shaft which may be connected to the engine of the automobile to start the same.

The main object is to provide suitable means whereby the starting shaft will be released in case of back fire of the engine.

In the accompanying drawings: Figure 1 is a view in side elevation of the invention, partly in section; and Fig. 2 is a similar view showing the parts in their released position.

A, represents the frame, in which a starting shaft 1 is journaled. The engine shaft 2 is provided with a clutch 3, which is engaged by the clutch 5 of the starting shaft. The starting shaft is provided with a sleeve 6, which carries the clutch 5, and one end of the sleeve is provided with teeth 7 which are adapted to interlock with the teeth 8 on the shaft 1. The sleeve is slidably mounted upon the shaft. A spring 9 is located between the sleeve and end of the starting shaft 1, so that in starting the engine, the cranking shaft is pressed inward to cause the teeth on the sleeve to engage the teeth of the starting shaft, forming a joint so that when the clutch 5 is brought into engagement with the clutch on the engine shaft, the engine shaft can be rotated for starting the engine. A cross bar 10 is connected to the frame, and mounted upon the cross bar is a stationary clutch 11, which is adapted to be engaged by a collar 12 having a tooth 13 on one face which meshes or engages with the stationary clutch 11 of the cross bar. The other face of the collar is provided with ratchet teeth 14. A clutch 16 is connected to the shaft 1 and is capable of a slight reciprocating or sliding movement thereon. A spring 17 tends to hold or force the clutch toward the collar 12. The clutch is provided with ratchet teeth 18, which are adapted to engage the ratchet teeth of the collar 12.

In cranking the engine, the starting shaft is pushed in and turned to the right by means of the handle 20. This overcomes the tension of spring 9 and the toothed face of the sleeve 6 is brought into engagement with the teeth of the shaft 1, so that the sleeve is rotated with the shaft and the teeth 18 of clutch 16 ride over teeth 14 on collar 12. The clutch 5 engages the clutch of the engine shaft, causing the engine shaft to be rotated. Should the engine start in the wrong direction or back-fire, the clutch on the engine shaft would carry the clutch of the starting shaft with it. The teeth of the clutch 16 would engage the ratchet teeth of the collar 12, causing the collar to be rotated, and as the tooth 13 of the collar 12 engages the stationary clutch 11, would cause the starting shaft to be disengaged from the sleeve 6, due to the teeth of the collar 12 riding up on the inclined teeth of the clutch 11 and drawing the starting shaft away from the sleeve. The clutch 16 will be caused to move on the shaft 1 as the collar 12 is forced away from the clutch 11. When the engine shaft starts its forward rotation it is of course understood clutches 3 and 5 disengage in the usual manner.

Having fully described our invention, what we claim as new and desire to secure by Letters Patent, is:—

1. In a starting device for engines, the combination with a clutch member on the engine shaft, of a rotatable, endwise movable starting shaft, a sleeve slidably mounted upon the shaft, means whereby the shaft and sleeve are connected together, a spring interposed between the shaft and sleeve for holding the sleeve normally out of rotatable engagement with the shaft, a clutch carried by the sleeve adapted to engage the clutch on the engine shaft, a pair of shaft separating members mounted on said starting shaft and provided with coöperating cam surfaces whereby they are separated by relative turning movement between them, one of said shaft separating members being carried by said shaft, and the other being loosely mounted on the shaft, and means for preventing the rotation of said last-named member in one direction.

2. In a starting mechanism for engines, the combination with a frame and a clutch member of an engine shaft, of a rotatable, endwise movable starting shaft mounted on the frame, a sleeve slidably mounted on the starting shaft, means for locking the sleeve to the shaft, a spring interposed between the starting shaft and sleeve for normally disengaging the sleeve from rotation with the starting shaft, a clutch carried by the sleeve engaging the clutch of the engine shaft, a pair of shaft separating members mounted on said starting shaft, and provided with coöperating cam surfaces, whereby they are separated by relative turning movement between them, one of said shaft separating members being secured against rotary movement on said starting shaft, and the other being rotatably mounted on said starting shaft, and a clutch adapted to engage said last-named member for preventing its rotation in one direction.

In testimony whereof we affix our signatures, in the presence of two witnesses.

J. O. ROBERTS.
JOHN W. NUNN.

Witnesses:
R. H. BROOKSHIRE,
A. A. TANNEHILL.

---

Copies of this patent may be obtained for five cents each, by addressing the "Commissioner of Patents, Washington, D. C."